United States Patent [19]
Brady et al.

[11] Patent Number: 5,606,614
[45] Date of Patent: Feb. 25, 1997

[54] PERSONAL IDENTIFICATION SYSTEMS

[75] Inventors: Patrick S. Brady, London; Michael J. Kenning; David A. Roberts, both of Suffolk; Robert E. V. Semos, Kent; Mark J. Stirland; Richard B. Ward, both of Ipswich, all of England

[73] Assignee: British Telecommunications public limited company, London, England

[21] Appl. No.: 635,281

[22] Filed: Apr. 19, 1996

Related U.S. Application Data

[63] Continuation of Ser. No. 213,019, Mar. 15, 1994, abandoned.

[30] Foreign Application Priority Data

Oct. 15, 1993 [GB] United Kingdom .................. 9321357

[51] Int. Cl.⁶ .............................. H04L 9/32; G06K 5/00
[52] U.S. Cl. ............................................. 380/23; 235/380
[58] Field of Search ....................... 380/23–25; 235/380, 235/379, 382

[56] References Cited

U.S. PATENT DOCUMENTS

| | | |
|---|---|---|
| 4,614,861 | 9/1986 | Pavlov et al. ............................ 235/380 |
| 4,630,201 | 12/1986 | White . |
| 4,720,860 | 1/1988 | Weiss . |
| 4,758,718 | 7/1988 | Fujisaki et al. ...................... 235/380 X |
| 4,802,217 | 1/1989 | Micheren ................................. 380/29 |
| 4,856,062 | 8/1989 | Weiss . |
| 4,885,778 | 12/1984 | Weiss .................................... 380/23 X |
| 4,974,193 | 11/1990 | Beutelspacter et al. .............. 380/25 X |
| 4,998,279 | 3/1991 | Weiss . |
| 5,023,908 | 6/1991 | Weiss . |
| 5,058,161 | 10/1991 | Weiss . |
| 5,068,894 | 11/1991 | Hoppe ..................................... 380/23 |
| 5,097,505 | 3/1992 | Weiss . |
| 5,130,519 | 7/1992 | Bush . |
| 5,168,520 | 12/1992 | Weiss . |
| 5,317,636 | 5/1994 | Vizcaino ................................. 380/23 |
| 5,478,994 | 12/1995 | Rahman et al. ........................ 235/380 |

FOREIGN PATENT DOCUMENTS

| | | |
|---|---|---|
| 0234100 | 9/1987 | European Pat. Off. . |
| WO85/03787 | 8/1985 | WIPO . |
| WO91/06926 | 5/1991 | WIPO . |

*Primary Examiner*—Gilberto Barron, Jr.
*Attorney, Agent, or Firm*—Nixon & Vanderhye P.C.

[57] ABSTRACT

In personal identification systems which compare passwords in a verification computer to identify a user, successive passwords are generated, or retrieved from a stored list in the verification computer in response to each entry of a public username into the verification computer. A user device carried by the user retrieves the next successive password from a stored list in response to a command from the user and displays the password. The user then reads this password and offers it to the verification computer via a keyboard entry to be compared with the password already generated or retrieved in response to the username (the expected password).

19 Claims, 2 Drawing Sheets

FIG. 3
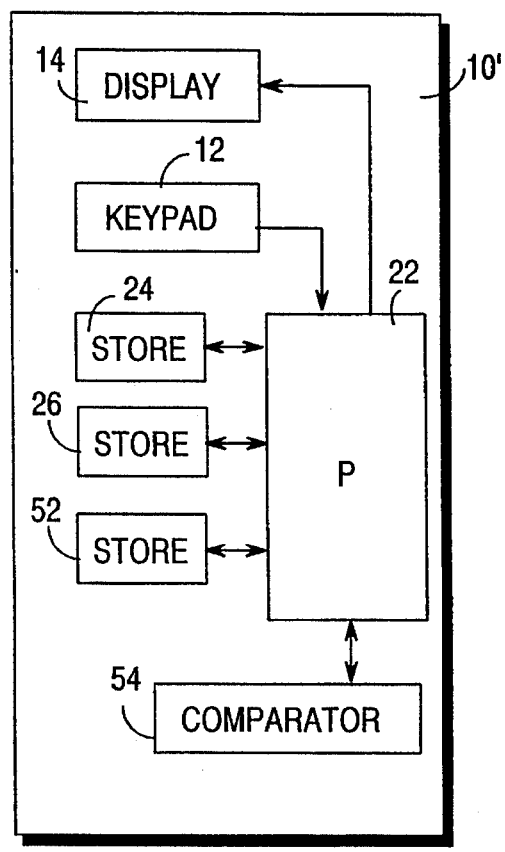
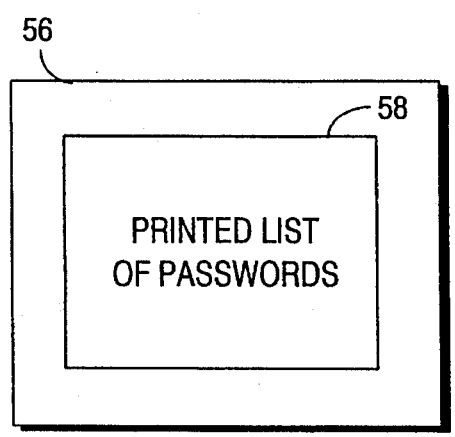
FIG. 4

PERSONAL IDENTIFICATION SYSTEMS

This is a continuation of application Ser. No. 08/213,019, filed Mar. 15, 1994, now abandoned.

BACKGROUND OF THE INVENTION

1. Field of the Invention

The present invention relates to personal identification systems, and to user devices and verification computers for use therein.

2. Related Art

A personal identification system is used to identify a person as having authority to access the entity or facility that is guarded by the system. Examples of such access include logging on to a computing system, control system or database, possibly via a telecommunications link, and entry to a room or building. Upon identifying a person, commonly called a user, the verification computer enables an access control means specific to the particular application.

It is known, for example from U.S. Pat. No. 4,720,860, to generate passwords in accordance with a predetermined algorithm having a time dependent variable input provided by a digital clock which defines the variable as a function of the date and a predetermined interval of time. Thus the value of the variable input will change for each successive interval of time and in accordance with the actual value of time at, say, the start of each interval. Passwords are continually generated in a user device carried by an authorised user, the device having an internal clock which is initially synchronised with the internal clock of a verification computer. To gain a desired access via the verification computer, the user provides a public username to the verification computer followed by the password currently being generated by his user device. If this password matches a corresponding password generated by the verification computer in response to a recognised username and in accordance with its internal clock, the user is recognised or identified, and the access control means is enabled.

In accordance with a first aspect of the present invention, there is provided a personal identification system which practices a method of identifying a user comprising the steps of communicating to a verification computer a public username and an offered password, the offered password being provided by a user device in the possession of the user and being or having been generated in accordance with a first predetermined algorithm having an input formed by a static variable, utilizing in the verification computer the communicated username either to provide an expected password and to compare the communicated offered password with the expected password to identify the user upon the occurrence of a match, the expected password being or having been generated in accordance with the first predetermined algorithm with an expected value of the static variable, or to process the communicated offered password in accordance with the inverse of the first predetermined algorithm to obtain the value of the static variable corresponding to the communicated offered password and to compare the obtained value with the expected value of the static variable to identify the user upon the occurrence of a match, the expected value of the static variable of the utilising step being or having been generated directly or indirectly from the expected value corresponding to the next preceding match in accordance with a second predetermined algorithm.

In accordance with a second aspect of the present invention, there is provided a personal identification system which practices a method of verifying a user comprising the steps of communicating to a verification computer a public username and offered verification information, herein referred to as OVI, utilising in the verification computer the communicated username to provide expected verification information, herein referred to as EVI, and comparing the communicated OVI directly or indirectly with the EVI, the verification computer accepting the user as identified if the comparison result is a match, the OVI being provided by a user device in the possession of the user and being obtained in accordance with a first predetermined process, and the EVI being obtained in accordance with a second predetermined process, the method being characterised by either the OVI being or having been generated from static information associated with verification information last provided by the user device, and the EVI being or having been generated from static information associated with verification information last used by the verification computer successfully to identify the user, or the OVI being or having been generated from other information provided by the verification computer, and the EVI being or having been generated from the said other information.

In accordance with a third aspect of the present invention, there is provided a user device for use in a personal identification system, the device comprising means for storing a list of passwords, means responsive to receipt of a command signal for retrieving, in use, a password from the storing means, and means for providing the retrieved password, in use, to a verification computer of the system.

In accordance with a fourth aspect of the present invention, there is provided a user device for use in a personal identification system, the device comprising means for generating in response to receipt of a command signal a password to be offered, in use, to a verification computer of the system, and means for providing the generated password, in use, to the verification computer, the generating means being arranged to generate the password in accordance with a first predetermined algorithm having an input formed by a variable.

In accordance with a fifth aspect of the present invention, there is provided a verification computer for use in a personal identification system, comprising input means for receiving plural characters, means responsive to the receipt via the input means of a first predetermined character string, constituting a predetermined user name, for providing an expected password, means responsive to the receipt via the input means of a second predetermined character string, at least a part of which constitutes an offered password, for comparing the offered and expected passwords and for providing an indication in the event of a match, and means for counting said indications, and wherein the providing means comprises means for storing a list of passwords and means responsive directly or indirectly to the current count of the counting means for retrieving, in use, a password from the storing means.

In accordance with a sixth aspect of the present invention, there is provided a verification computer for use in a personal identification system, comprising input means for receiving plural characters, means responsive to the receipt via the input means of a first predetermined character string, constituting a predetermined user name, for providing an expected password, means responsive to the receipt via the input means of a second predetermined character string, at least a part of which constitutes an offered password, for comparing the offered and expected passwords and for providing an indication in the event of a match, and means for counting the indications, and wherein the providing means comprises means for generating the expected password in accordance with a predetermined algorithm having a variable input formed directly or indirectly by the current count of the counting means.

BRIEF DESCRIPTION OF THE DRAWINGS

Embodiments of personal identification systems in accordance with the present invention will now be described by way of example with reference to the drawings, in which:

FIG. 3 is a schematic diagram of a modified form of the user device of the personal identification system of FIG. 1; and FIG. 4 is a schematic diagram of an alternative form of user device for use with a personal identification system of the present invention.

DETAILED DESCRIPTION OF EXEMPLARY EMBODIMENTS

Figure 1:
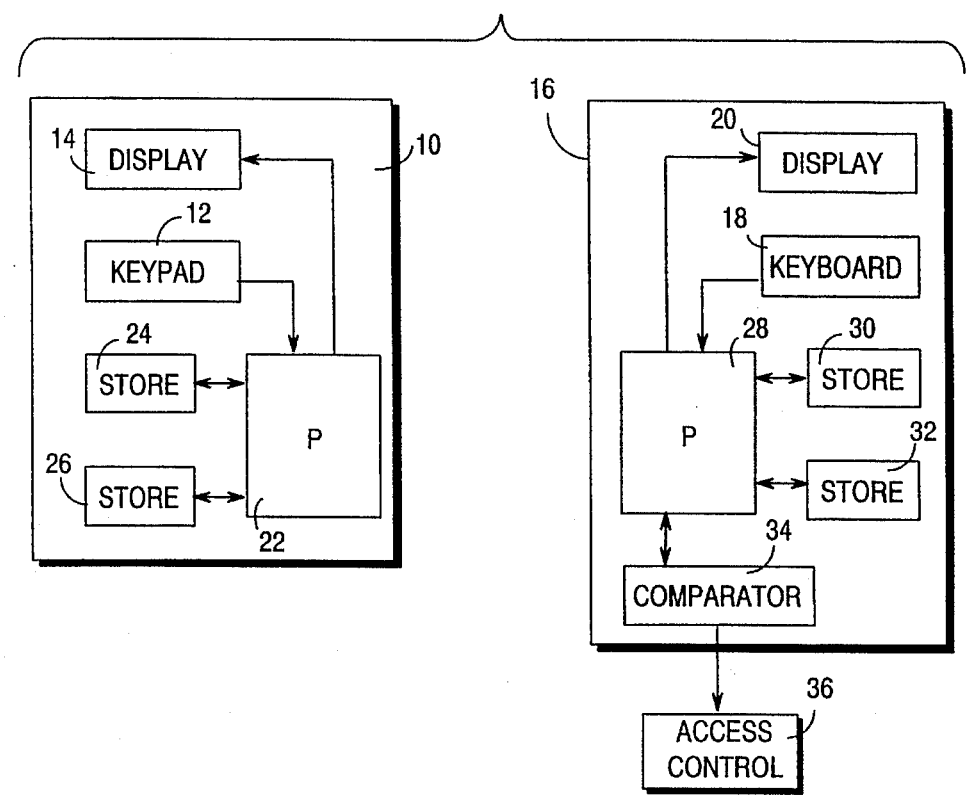
FIG. 1 is a schematic diagram of a first embodiment of a personal identification system of the present invention.

In FIG. 1 a personal identification system comprises a user device 10 having a pressure sensitive keypad 12 for numeric input and an LCD display 14, and a verification computer 16 having a keyboard 18 for alphanumeric input and an LCD display 20. User device 10 has substantially the same dimensions as those of a present-day credit card-sized calculator and further comprises a processor 22 with associated stores 24 and 26 containing a secret user-specific code (USC) and a sequence number, respectively.

The verification computer 16 comprises a corresponding processor 28 with corresponding associated stores 30 and 32 containing respective USCs and sequence numbers for the users to be identified by the system.

Upon communication of a user's username (UN) to the verification computer 15, in this embodiment by the user keying in his UN on the keyboard 18, the processor 28 checks the UN against a store of authorised UNs, and if the UN is recognised, reads from stores 30 and 32 the respective USC and sequence number corresponding to the input UN, and processes them as static variable inputs in accordance with a predetermined algorithm (also referred to as a process) to produce an expected password. As used herein the term "password" does not imply that a password has to be kept secret, since each is used once only and the next following password cannot be generated from a current password unless the impersonator knows at least the algorithm, the user-specific code and the current value of the static variable.

Upon actuation of a predetermined one of the keys (a NEXT key) of keypad 12 by the user (i.e. providing a command signal), the processor 22 reads the contents of stores 24 and 26, processes them in accordance with the same predetermined stored algorithm to produce a password, and displays the password on the LCD display 14. This password will be referred to as an offered password.

The user reads like offered password displayed on his user device and keys this into the verification computer 16 via the keyboard 18 following the input of his UN. The verification computer 16 now makes a comparison of the expected and offered passwords using comparator 34 which provides an enabling signal on its output if the two passwords are identical, thus signifying that the user has been identified as having authority for the access that the personal identification system is guarding, and the enabling signal will be coupled to an appropriate access control means 36.

The predetermined algorithm is arranged such that after the sequence number has been read from store 26 (and 32), the number is incremented and written back into the store 26 (and 32) to replace the stored sequence number.

It will be understood that one of the necessary conditions for identical expected and offered passwords is that the respective sequence numbers must be identical. If a user actuates his user device 10 and does not make a corresponding entry for his UN into the verification computer 16, say through accidental actuation of the user device 10, the sequence number in store 26 will be greater than that in store 32. To allow for this possibility, if the comparator 34 does not provide the enabling signal upon comparison of the expected and offered passwords, the processor 28 proceeds to increment the sequence number in store 32 and perform another comparison with the offered password. If there has been no successful comparison (match) for five successive increments of the sequence number processor 28 will decrement the sequence number five times to restore the sequence number in store 32 to its original value. On the other hand, if there is a match then processor 28 simply increments the current sequence number to re-synchronise the user device 10 and verification computer 16.

Instead of incrementing and decrementing the sequence number in store 32 in the event of no match, the sequence number can be written into a further store for the purpose of incrementing and trying a new comparison. If there is a match then the value in the further store is written into store 32 and then incremented. If there is no match then the processor leaves the stores as they are because at the next "no match" the value in store 32 will overwrite the value in the further store.

Figure 2:
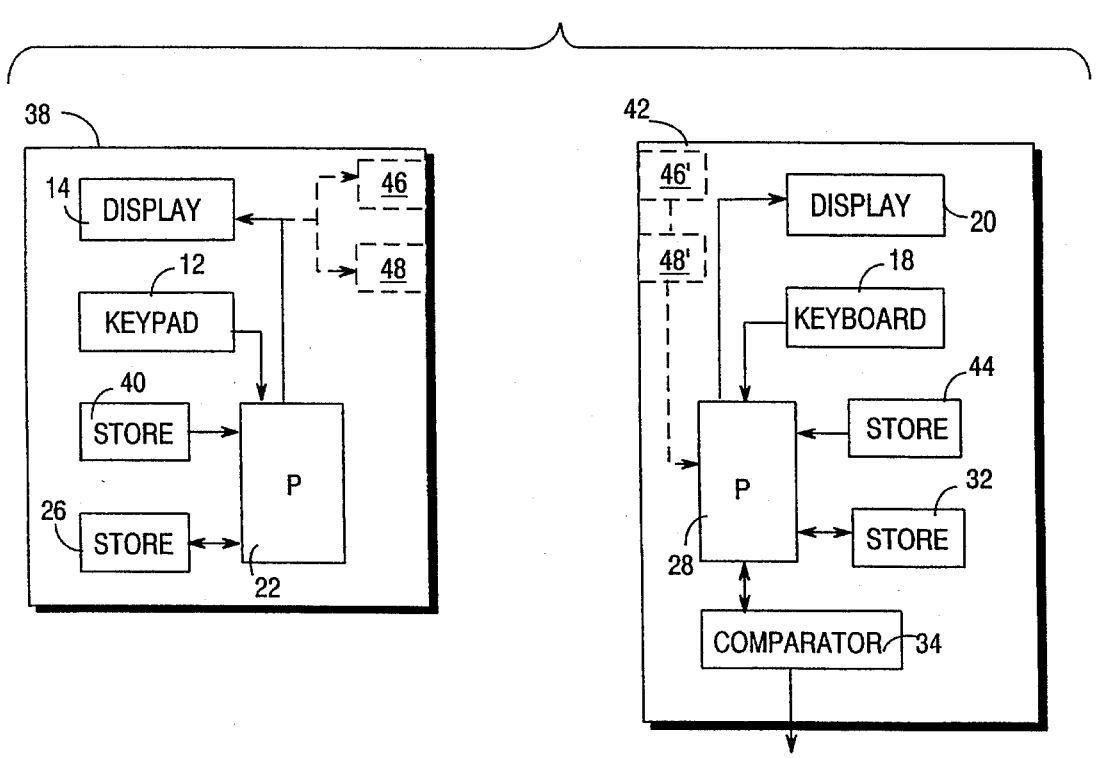
FIG. 2 is a schematic diagram of a second embodiment of a personal identification system of the present invention.

In FIG. 2, which shows an alternative embodiment of a personal identification system of the present invention, a user device 38 comprises the same elements as user device 10 except that: store 24 is replaced by a large capacity store 40 containing a list of passwords previously generated in accordance with the predetermined algorithm, the USC, and a series of consecutive sequence numbers; store 26 contains a pointer to the next password location to be read; and processor 22, upon actuation of the user device 10, reads the pointer value from store 26, reads the password from the corresponding location in store 40, displays this on the LCD display 14 as the offered password, increments the value of the pointer and writes this into store 26. In this embodiment processor 22 does not process any inputs in accordance with a stored algorithm but merely reads a stored password and displays it.

The number of passwords stored in store 40 will depend on the expected lifetime of the user device, including unintentional actuations, and can be several thousands.

Also shown in FIG. 2, is a verification computer 42 which similarly comprises the same elements as verification computer 16 with the exception that store 30 is replaced by a large capacity store 44 containing for each user to be identified a respective list of passwords previously generated in accordance with the predetermined algorithm, the respective USC, and a series of consecutive sequence numbers, that store 32 contains respective current pointers for the users, and that processor 28, upon communication of a recognised UN, reads the respective pointer value from store 32, reads the corresponding password from the corresponding location in store 44 the expected password), and passes it to the comparator 34, and increments the value of the pointer and writes this into store 32. Processor 28 similarly does not have a stored algorithm for processing a USC and sequence number.

It will be appreciated that user device 10 can be used in conjunction with verification computer 42, and that user device 38 can be used in conjunction with verification computer 16.

Instead of the communication of the offered password from user device 10, 38 being indirect via the user and keyboard 18, it may be direct by means of contacts 46 or a transmitter 48 (rf, acoustic, using DTMF tones, or ultrasonic), shown in dashed lines in FIG. 2. Verification computer 42 will have corresponding contacts 46' or receiver 48' instead of or in addition to the keyboard 18.

In the modified user device 10' in FIG. 3, there is a further store 52 and a comparator 54. When the user first receives the user device 10' he has to input via the keypad 12 a personal identification number (PIN) which is stored in store 52. The output of comparator 54 is used to inhibit the response of the processor 22 to the signal from the NEXT key until the correct PIN is input. In alternative arrangements, the output of comparator 54 is used to inhibit the LCD display 14, or the sending of the offered password to the display 14, and/or it is used to provide the offered password whereby the entering of the correct PIN constitutes a command signal for the user device.

The further store 52 and comparator 54 could be included in the user device 38, if desired.

In a modification of the above systems, the verification computer 16, 42 requires the receipt of a PIN which it checks against a respective stored value of PIN for the input UN, and actuation of the access control means 36 requires the correct PIN and the correct offered password. The user can enter this PIN at the keyboard 18. In a variant this PIN is held in storage in the user device 10, 10', 38 and communicated directly or indirectly from it to the verification computer 16, 42. In a further modification processor 22 combines a stored PIN with the generated or retrieved password in accordance with a combining algorithm to produce a PIN-modified offered password. In the verification computer 16, 42 processor 28 combines the value of the stored PIN with the expected password in accordance with the same combining algorithm to produce a PIN-modified expected password and the two passwords are compared by comparator 34. In a variant of the verification computer 16, 42 the processor 28 processes the received PIN-modified offered password to produce the offered PIN and the offered password which are then respectively compared with the stored PIN and the expected password. The stored PIN can be the same as or different from the PIN used to enable the user device 10'.

In a modification of the user device 10', store 52 is arranged to store a first PIN for normal use, and a second PIN for abnormal use (e.g. use under duress), and the processor 22 is arranged to combine the matched first or second PIN with the generated password. The verification computer will detect whether the first (normal) PIN is used, or whether the user has input the second (duress) PIN to alert the verification computer to the situation and actuate an alarm. The processor is also arranged to respond to any PIN other than the first and second PINs by providing the next password in sequence from a predetermined set of passwords (e.g. twenty special passwords) which the verification computer will recognise as unauthorised use of the user device. The processor takes a progressively longer time to provide the password as more unauthorised attempts are made, e.g. several minutes, so as to inconvenience the unauthorised user. When the verification computer recognises any of the special passwords it takes no action.

In a further embodiment of a user device 56 of the present invention shown in FIG. 4, a previously generated series of passwords is stored as hard-copy 58 as opposed to electronic storage in store 40 of user device 38. The hard copy is in the form of a pad of sheets having a single password on each sheet in sequence from the top sheet downwards. The user enters at the keyboard 18 the password printed on the uppermost sheet, and then removes this sheet in readiness for the next identification occurrence. It is not necessary for the sheet to be disposed of confidentially since for a third party to impersonate the user he would need (in addition to the non-secret UN) the user's USC, the algorithm and the sequence number for next attempted access (or at lease not greater than the limit of the synchronisation window, i.e. current sequence number plus five). It is virtually impossible for an impersonator to be able to generate such a password.

In an alternative to user device 56, the hard copy 58 has more than one password on a sheet and the user has to delete a used password with e.g. pen or pencil.

In a further alternative to user device 56, the hand copy is in the form of a continuous strip of paper (rolled or folded) with transverse perforations separating each password so that a used password can be readily detached from the end of the strip.

The above described identification method can be extended such that after the verification computer 16, 42 has identified (authenticated) the user, it then generates or retrieves the next password and communicates it to the user via the LCD display 20 for mutual authentication. The user actuates his user device 10, 10', 38 to obtain the next offered password (or reads the next password from user device 56) and mentally checks that they are the same.

Where a user device can communicate an offered password directly to the verification computer, say by contacts, the mutual authentication process can be automatic if the processor 22 is arranged to receive the next password from the verification computer via the contacts to perform a comparison and to display a predetermined group of characters on the LCD display 14 to indicate the result of the mutual verification process. Depending on the programming of processor 22 the characters can be alphanumeric or numeric. Alternatively, or additionally, authentication of the verification computer can be indicated to the user by an acoustic signal.

The above described personal identification systems can be used to guard access to computer terminals in a wide variety of circumstances where secure access is required. The access can be remote via a telecommunications link, via modems if required. The systems can be used to guard access to buildings, rooms and the like, in this case the access control means 36 is arranged to unlock a door or the like to give the user access to the guarded property.

In alternative embodiments of systems in accordance with the present invention the processor 28 in verification computer 42 is arranged to respond to the input of a UN to convert, in accordance with a further algorithm (preferably a pseudo random number generator), the value of the running total of successful UN inputs (i.e. those which result in a match of offered and expected passwords) into a substitute value to be used as the pointer and write it into store 32. The verification computer obtains the expected stored password from the store Location corresponding to the pointer stored in store 32, and also displays the pointer. The user reads the displayed pointer and inputs this via keypad 12 into the user device which utilises the input pointer to read the offered password from the corresponding location in store 40 and display it on the LCD display 14 as before. The user enters this offered password into the verification computer for comparison with the expected password as before.

Instead of generating the substitute value for the pointer in response to the input of the UN, the processor 28 can generate and store the substitute value at the conclusion of a password match, and merely respond to the UN input by reading store 32.

It will be understood that in such embodiments the substitute value for the pointer in the verification computer can be previously generated and held in store or can be generated in real time, independently of whether the expected passwords are previously generated and held in store or are generated in real time. Similarly, in user devices which utilise a running total of received command signals a corresponding substituted pointer value can be previously generated and held in store or can be generated in real time, independently of whether the offered passwords are previously generated and held in store or are generated in real time; and in user devices which utilise a communicated input, a received substitute pointer is used as a static variable input to the algorithm (for real time generation) or as an address pointer (for previous generation) or is converted by the inverse of the further algorithm to the corresponding sequence number where the offered password is generated in accordance with the predetermined algorithm in combination with the further algorithm, or where the verification computer communicates the sequence number of UN inputs, a corresponding substitute pointer is obtained in the user device from previously generated values held in store or generated in real time, independently of whether the offered password is previously generated and held in store or generated in real time.

It will be appreciated that a username can be any combination of alphanumeric characters, as is known in the art, and that if desired actuation of the user device can be by entering a username, keypad 12 being arranged for alpha characters as well as or instead of numeric characters, as the case may be, and that if a lower level of security is acceptable, then the USC input to the predetermined algorithm can be omitted.

Instead of generating, or retrieving, a password in response to a UN input or a command signal, the processor in the user device and/or the verification computer can generate or retrieve the next expected/offered password and put it into a store in readiness for the next access attempt.

It will be appreciated that the above described methods are not limited to identifying the user at an initial point of entry to a system etc., but can also be used to identify the user to a remote destination, for example the password can be appended to the end of an electronic message to verify to the recipient the alleged sender of the message, the verification being performed by the destination terminal.

It is expected that the user will usually be human, but it is envisaged that non-human forms, for example robotic forms and intelligent terminals, can use such a method to identify themselves.

In the abovedescribed embodiments the verification computer compares two independently obtained passwords each of which is or has been generated by use of the same predetermined algorithm. The present invention also embraces methods and systems in which the verification computer processes the received offered password in accordance with the inverse of the algorithm with which it was generated and thus obtains the value (s) of the input (s) used in the generation of the offered password and makes a comparison with an expected value(s) for such input(s).

As described above, the verification computer generates a static variable input for the predetermined algorithm as a sequence number, preferably by incrementing a running total, the sequence in this case being a series of natural numbers. The increment need not be the unity value, and the step between adjacent numbers in the sequence can be two or three, or any suitable value. In the general case, the verification computer stores a value associated with the last match and generates the next expected value from it in accordance with a predetermined algorithm, for example the running total of matches or the generation of a random number from the running total using a pseudo random number generator, which may be in the form of a series of shift registers with feedback as is known in the art or in the form of a stored list of numbers which themselves may have been generated by such an arrangement or may have been obtained by a truly random process, this last form of random numbers being appropriate where the passwords for the user device are previously generated and stored in the device. Where the predetermined algorithm is a linear function then the next expected value can be considered to be obtained directly from the value for the last match, but where the algorithm includes a non-linear function such as the random number generator then the expected value can be considered to be obtained indirectly from the value for the last match.

We claim:

1. A user device for use in a personal identification system, the device comprising:

actuation means for providing a command signal upon actuation by a user;

a pointer store for storing a pointer;

a password store for storing a list of passwords;

means responsive to receipt of said command signal to retrieve a stored pointer from said pointer store, to retrieve a stored password from a location of said password store in accordance with the retrieved pointer and to increment the contents of said pointer store; and means to provide the retrieved password to a verification computer of the system.

2. A user device as in claim 1 wherein said actuation means comprises:

a PIN store for storing a PIN;

PIN entry means for entry of a PIN by a user; and a comparison means responsive to entry of a PIN to compare the entered PIN with a PIN stored in the PIN store and, in the event of a match, to provide said command signal.

3. A verification computer for use in a personal identification system, comprising:

input means for receiving a character string;

first storage means comprising sets of associated stores for storing user-related data, each set comprising username, user-specific code, and pointer;

second storage means having a plurality of locations for storing numbers;

control means responsive to receipt via the input means of a first character string which matches a stored username, to retrieve the contents of the user-specific code store and the pointer store associated with the matched username, to retrieve the contents of the location of said second storage means corresponding to the retrieved pointer, to generate an expected password by applying the retrieved user-specific code as a first input of a predetermined algorithm and applying the retrieved number as a second input of said predetermined algorithm, said control means being also responsive to the receipt via the input means of a second character string, constituting an offered password, to compare the offered and expected passwords and, in the event of a match, to provide an indication and to increment the contents of the corresponding pointer store.

4. A verification computer as in claim 3 including:

output means for outputting character strings, and wherein said control means is arranged to respond to said indication to generate the next following expected password corresponding to the current username and to supply said next following expected password to the output means.

5. A verification computer for use in a personal identification system, comprising:

input means for receiving a character string;

first storage means comprising sets of associated stores for storing user-related data, each set comprising username, user-specific code, and pointer;

second storage means having a plurality of locations for storing numbers;

control means responsive to receipt via the input means of a first character string which matches a stored username, to retrieve the contents of the user-specific code store and the pointer store associated with the matched username, to retrieve the contents of the location of said second storage means corresponding to the retrieved pointer, to generate an expected password by applying the retrieved user-specific code as a first input of a predetermined algorithm and applying the retrieved number as a second input of said predetermined algorithm, said control means being also responsive to the receipt via the input means of a second character string, constituting an offered password, to compare the offered and expected passwords and, in the event of a match, to provide an indication and to increment the contents of the corresponding pointer store, said computer being for use when the user-specific code is stored in the form of a PIN-modified user-specific code which has been generated by applying the user-specific code as a first input of a second predetermined algorithm and applying a PIN as a second input of said second predetermined algorithm, wherein:

the control means is responsive to receipt of a third character string to apply the received third character string as a first input of the inverse of said second predetermined algorithm, to retrieve the contents of the user-specific code store corresponding to the input username and apply the retrieved contents as a second input of said inverse of said second predetermined algorithm and to apply the output of said inverse of said second predetermined algorithm as the first input of said predetermined algorithm.

6. A verification computer as in claim 5 including:

output means for outputting character strings, and wherein said control means is arranged to respond to said indication to generate the next following expected password corresponding to the current username and to supply said next following expected password to the output means.

7. A method of identifying a user comprising the steps of:

communicating to a verification computer a public username and an offered password, the offered password being provided by a user device in the possession of the user, utilizing in the verification computer the communicated username to identify a respective pointer store and a respective user-specific code store associated with the communicated username, retrieving a stored pointer from said respective pointer store, retrieving a member of a stored list of numbers in accordance with said retrieved pointer, retrieving a stored user-specific code from said respective user specific code store, generating an expected password with a predetermined algorithm having a first input formed by said retrieved user-specific code and a second input formed by the retrieved member, comparing the communicated offered password with the expected password, and, upon the occurrence of a match, treating the user as identified and incrementing the contents of said respective pointer store.

8. A method as in claim 7 wherein, to obtain the offered password, the user device performs the steps of:

retrieving a stored pointer from a pointer store, retrieving a member from a stored list of previously generated passwords in accordance with said retrieved pointer, the retrieved member constituting said offered password, and incrementing the contents of said pointer store.

9. A method as in claim 8 including the prior steps of:

storing a respective username for a new user, storing a respective user specific code in the associated user specific code store for the new user, generating an initial pointer and storing the initial pointer in the associated pointer store for the new user, generating with said predetermined algorithm the respective list of passwords to be stored in a user device to be issued to the new user, retrieving an initial member of a stored list of numbers in accordance with said initial pointer;

applying said respective user-specific code as said first input, said retrieved initial member as said second input and producing subsequent values for said second input by repeated incrementing of said initial pointer, entering the generated list of passwords into a store in the user device with the first password so generated being stored in the first location of the store, and issuing the user device to the new user.

10. A method as in claim 9, together with the further steps, for identifying the verification computer to the user, of:

providing the next following expected password upon the occurrence of matching passwords, and comparing the next following expected password with the next following offered password provided by the user device.

11. A method as in claim 10 further including:

communicating the next following expected password directly to the user device, comparing it with the next following offered password in the user device, and providing an indication of a match to the user.

12. A method as in claim 8, together with the further steps, for identifying the verification computer to the user, of:

providing the next following expected password upon the occurrence of matching passwords, and comparing the next following expected password with the next following offered password provided by the user device.

13. A method as in claim 12 further including:

communicating the next following expected password directly to the user device, comparing it with the next following offered password in the user device, and providing an indication of a match to the user.

14. A method as in claim 7, together with the further steps, for identifying the verification computer to the user, of:

providing the next following expected password upon the occurrence of matching passwords, and comparing the next following expected password with the next following offered password provided by the user device.

15. A method as in claim 14 further including:

communicating the next following expected password directly to the user device, comparing it with the next following offered password in the user device, and providing an indication of a match to the user.

16. A method of identifying a user comprising the steps of:

communicating to a verification computer a public username and an offered password, the offered password being provided by a user device in the possession of the user, utilizing in the verification computer the communicated username to identify a respective pointer store and a respective user-specific code store associated with the communicated username, retrieving a stored pointer from said respective pointer store, retrieving a member of a stored list of numbers in accordance with said retrieved pointer, retrieving a stored user-specific code from said respective user specific code store, generating an expected password with a predetermined algorithm having a first input formed by said retrieved user-specific code and a second input formed by the retrieved member, comparing the communicated offered password with the expected password, and, upon the occurrence of a match, treating the user as identified and incrementing the contents of said respective pointer store, wherein, to obtain the offered password, the user device performs the steps of:

retrieving a stored pointer from a pointer store, retrieving a member from a stored list of previously generated passwords in accordance with said retrieved point, the retrieved member constituting said offered password, and incrementing the contents of said pointer store, including the prior steps of:

storing a respective username for a new user, storing a respective user specific code int he associated user specific code store for the new user, generating an initial pointer and storing the initial pointer in the associated pointer store for the new user, generating with said predetermined algorithm the respective list of passwords to be stored in a user device to be issued to the new user, retrieving an initial member of a stored list of numbers in accordance with said initial pointer;

applying said respective user-specific code as said first input, said retrieved initial member as said second input and producing subsequent values for said second input by repeated incrementing of said initial pointer, entering the generated list of passwords into a store in the user device with the first password so generated being stored in the first location of the store, and issuing the user device to the new user, modifying the user-specific code in accordance with a first personal identification number (PIN) and a second predetermined algorithm, storing the resulting PIN-modified user-specific code in said associated user-specific code store, communicating from the user a second PIN to the verification computer, and utilizing the second PIN and the inverse of the second predetermined algorithm to produce a user-specific code for use as said first input to said predetermined algorithm, the correct user-specific code being produced only when the second PIN is the same as the first PIN.

17. A method as in claim 16 together with the further steps, for identifying the verification computer to the user, of:

providing the next following expected password upon the occurrence of matching passwords, and comparing the next following expected password with the next following offered password provided by the user device.

18. A method of identifying a user comprising the steps of:

communicating to a verification computer a public username and an offered password, the offered password being provided by a user device in the possession of the user, utilizing in the verification computer the communicated username to identify a respective pointer store and a respective user-specific code store associated with the communicated username, retrieving a stored pointer from said respective pointer store, retrieving a member of a stored list of numbers in accordance with said retrieved pointer, retrieving a stored user-specific code from said respective user specific code store, generating an expected password with a predetermined algorithm having a first input formed by said retrieved user-specific code and a second input formed by the retrieved member, comparing the communicated offered password with the expected password, upon the occurrence of a match, treating the user as identified and incrementing the contents of said respective pointer store, previously modifying the user-specific code in accordance with a first personal identification number (PIN) and a second predetermined algorithm, storing the PIN-modified user-specific code in said associated user-specific code store, communicating from the user a second PIN to the verification computer, and utilizing the second PIN and the inverse of the second predetermined algorithm to produce a user-specific code for use as said first input to said predetermined algorithm, the correct user-specific code being produced only when the second PIN is the same as the first PIN.

19. A method of identifying a user comprising the steps of:

communicating to a verification computer a public username and an offered password, the offered password being provided by a user device in the possession of the user, utilizing in the verification computer the communicated username to identify a respective pointer store and a respective user-specific code store associated with the communicated username, retrieving a stored pointer from said respective pointer store, retrieving a member of a stored list of numbers in accordance with said retrieved pointer, retrieving a stored user-specific code from said respective user specific code store, generating an expected password with a predetermined algorithm having a first input formed by said retrieved user-specific code and a second input formed by the retrieved member, comparing the communicated offered password with the expected password, and, upon the occurrence of a match, treating the user as identified and incrementing the contents of said respective pointer store, wherein, to obtain the offered password, the user device performs the steps of:

retrieving a stored pointer from a pointer store, retrieving a member from a stored list of previously generated passwords in accordance with said retrieved point, the retrieved member constituting said offered password, and incrementing the contents of said pointer store, previously modifying the user-specific code in accordance with a first personal identification number (PIN) and a second predetermined algorithm, storing the PIN-modified user-specific code in said associated user-specific code store, communicating from the user a second PIN to the verification computer, and utilizing the second PIN and the inverse of the second predetermined algorithm to produce a user-specific code for use as said first input to said predetermined algorithm, the correct user-specific code being produced only when the second PIN is the same as the first PIN.

* * * * *